May 2, 1967

J. H. IMMARIGEON 3,316,855

SELECTIVE CONVEYOR

Filed Jan. 13, 1965

2 Sheets-Sheet 1

INVENTOR
JEAN H. IMMARIGEON
BY
Abraham A. Saffitz
ATTORNEY

May 2, 1967    J. H. IMMARIGEON    3,316,855
SELECTIVE CONVEYOR

Filed Jan. 13, 1965    2 Sheets-Sheet 2

INVENTOR
JEAN H. IMMARIGEON
BY
Abraham A. Saffitz
ATTORNEY

United States Patent Office 3,316,855
Patented May 2, 1967

3,316,855
SELECTIVE CONVEYOR
Jean H. Immarigeon, Sceaux, France, assignor to Société Mixte pour l'Etude et le Developpement de la Technique des Centres Postaux Mécanisés styled Somepost, Orly, France, a body corporate of France
Filed Jan. 13, 1965, Ser. No. 425,136
Claims priority, application France, Jan. 16, 1964, 960,529
3 Claims. (Cl. 104—88)

This invention relates to selective conveyor control, more particularly to a conveyor control enabling articles of any kind to be conveyed selectively between any number of loading and unloading stations each adapted to serve as a starting station or arrival station or temporary storage station.

The applicant's United Kingdom Patent 987,607 discloses an organization and control procedure for a continuous overhead conveyor such as the postal authorities use for selectively conveying mailbags between one or more originating places and a number of unloading stations. Conveyors of this kind comprise a main track and a number of auxiliary tracks, the whole forming a closed circuit which has a number of bypasses, the carriages being adapted to be driven around the circuit by continuous chains or to be disengaged therefrom in storage zones, and the main feature of the organization and control procedure disclosed by the aforesaid patent application is that each unloading station on an auxiliary track has two storage zones of the same capacity, one being disposed upstream and the other being disposed downstream of the unloading station, and the dispatch of a full carriage to any unloading station is subordinated to the return of an empty carriage from the storage zone downstream of such unloading station. Consequently, loads for any unloading station whose downstream storage zone has a supply of carriages which is zero causes build up at the loading stations.

It is an object of the invention to improve the flexibility of operation of selective conveyors. A main feature of the invention is that, the auxiliary paths are bypasses or shunts in respect the main path which is devoid of storage zone and the main path forms a continuously moving store of unconditional access, and the entrance of a carriage on to the auxiliary path for which such carriage is routed is subordinate to the presence in the storage zone downstream of such auxiliary path of a carriage which is to be returned so as to occupy in the main path the place left available by the carriage entering the auxiliary path.

Figure 1:
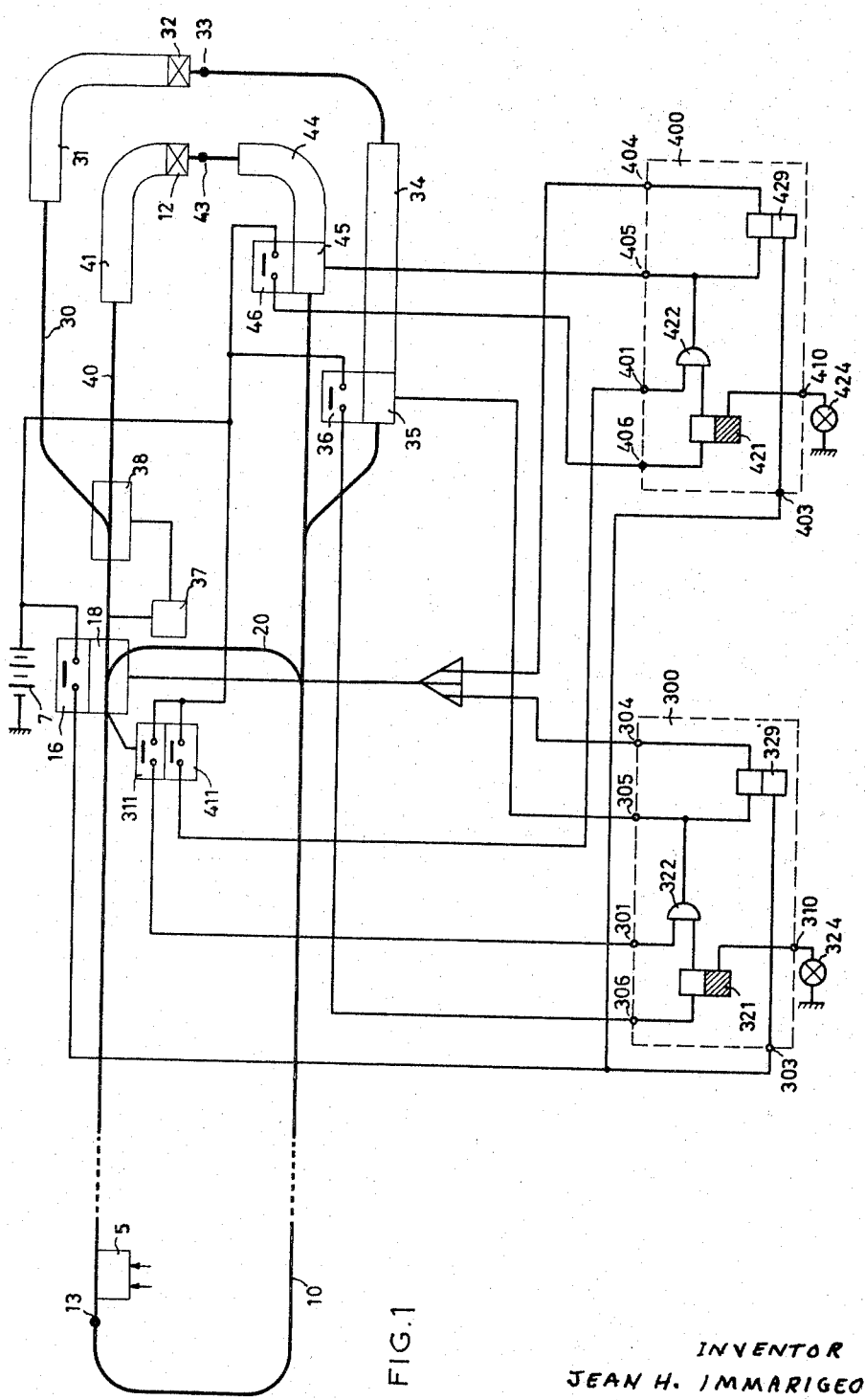
Figure 2:
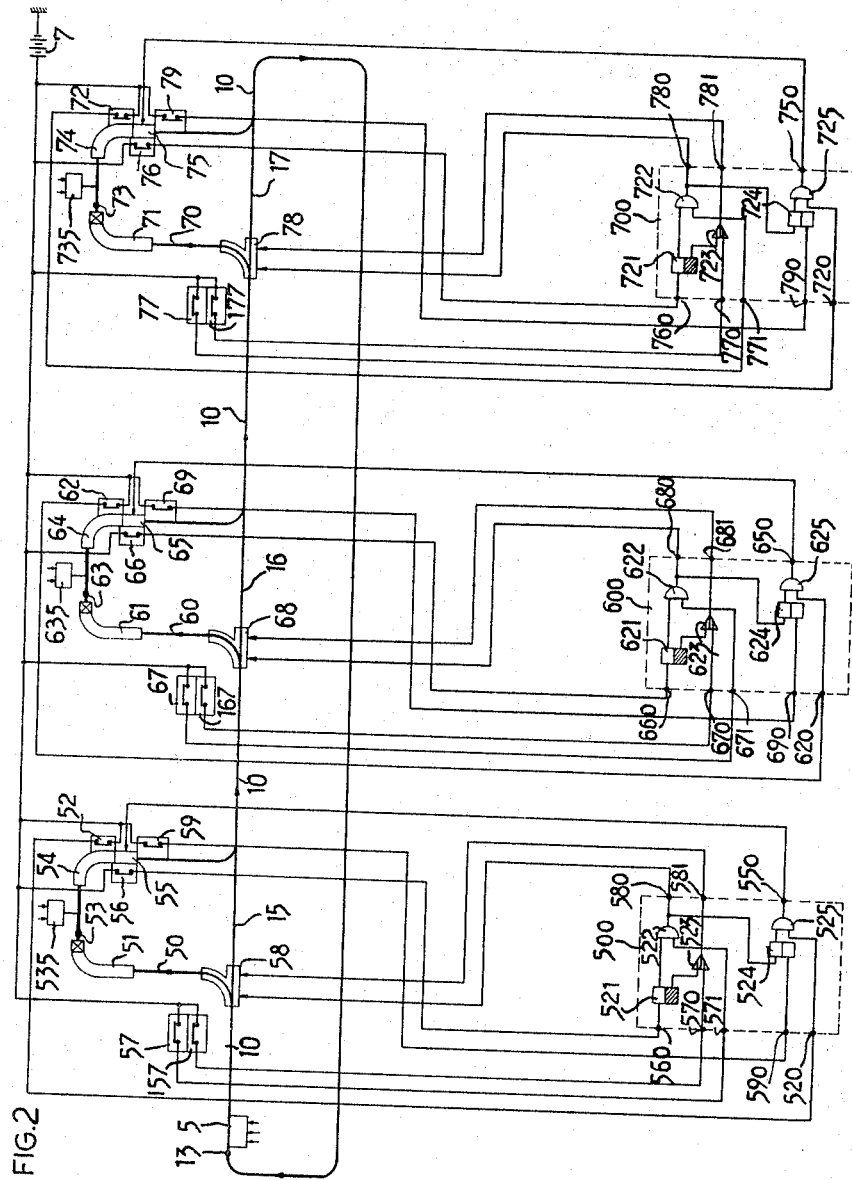

For a better understanding of the invention, reference may now be made to the following description and the accompanying drawings wherein:

FIG. 1 is a basic diagram showing the organization and control for a first embodiment of a conveyor according to the invention, and FIG. 2 is a basic diagram showing the organization and control for a second embodiment of a conveyor according to this invention.

The conveyor shown in FIG. 1 comprises a common path or track or the like 10 which divides into three bypass or shunt paths or tracks or the like 20, 30, 40, with the carriages travelling all these paths clockwise in closed circuit. Only the paths 30, 40 serve respective unloading stations 33, 43 each having disposed on the upstream and downstream side storage zones 31, 34 (station 33) and 41, 44 (station 43) of respectively equal capacity; entrance onto to the paths 30, 40 is restricted, but the path 20 is a relief path or bypass to which there is always access and whose presence leads to two advantages, namely—it becomes possible to provide a moving stock of carriages which can be loaded up unconditionally and which can wait until entry to the path leading to their destination is clear so that carriages do not accumulate at a loading station 13 on the common path 10; and the logical circuits can be reduced, only the circuits 300, 400 respectively being associated with the paths 30, 40 remaining in a very simplified form.

Since carriages loaded at the station 13 can be routed at the station 5 without any restrictive condition, no storage zone is required near the loading station. The junction between the path 10 and the relief path 20 comprises points 18 which are normally set to the relief path 20; upstream of points 18 is a routing detector having two sets of contacts 311, 411, and downstream of points 18 is a set of contacts 16 which is associated with the path 10. When a carriage routed to the path 30 or 40, and accordingly switched by points 18, operates the contacts 16, the same deenergizes the actuating relay of the points 18 to return to their normal position.

The junction between the paths 30 and 40 comprises points 38 operated as required by a relay device 37 in accordance with the routing of the approaching carriage. The exits from the upstream storage zones 31, 41 of the unloading stations 33, 43 are controlled by manual stop devices 32, 42, and the exits from the downstream storage zones 34, 44 are controlled by electric stop devices 35, 45; associated with the latter are contacts 36, 46 for checking that a carriage is present, as in the aforesaid United Kingdom patent.

The logic circuits 300, 400 for controlling the conveyor hereinbefore described are derived from the logical circuits of the aforesaid United Kingdom patent by obviation of the elements made superfluous by the simplification of the logical conditions due to the provision of the relief path 20 and are independent of the marking or routing controls 5, the latter being unconditional. The circuits 300, 400 are identical and like elements in them have references which differ from one another only in the hundreds digit.

The circuit 300 comprises a monostable trigger 321 which in its normal or rest position lights a telltale lamp 324 via an output 310 and which operates only when, since the presence of at least one carriage in the storage zone 34 closes the contact 36, its working input is connected via a terminal 306 and the contact 36 to a potential source 7. When in the operative position the trigger 321 opens an and-gate 322 whose second input is connected via a terminal 301 and the route-detecting contact 311 to the source 7. The output of the gate 322 is connected in parallel to an output terminal 305 and to the working input of a bistable trigger 329. The output put terminal 305 is connected to the control input of the electric stop device 35 associated with the zone 34. The operative output of the trigger 329 is connected via an output terminal 304 to a circuit for energizing the actuating relay for the points 18 so that the same are set for the paths 30, 40. The resetting input of the trigger 329 is connected via an input terminal 303 to the contacts 16 which are connected to the source 7 and which close briefly when a carriage passes along the extension of the path 10 towards the paths 30, 40.

The system hereinbefore described operates as follows:

At starting it will be assumed that a random number of loaded carriages is being held by the manual stop devices 32, 42 in the upstream storage zones 31, 41, and a random number of unloaded carriages is held by the electric stop devices 35, 45 in the downstream storage zones 34, 44. Tell tale lamps 324, 424 therefore are or are not lit according to whether the storage zones 34, 44, respectively are empty or are occupied to hold at least one carriage. When the driving chains are started, the carriages which are not held in the storage zones and which are unloaded and therefore unrouted move around the closed circuit formed by the common path 10 and the relief path 20. The operator at the loading station picks up the mailbags thereat at any rate he likes, reads on the collar or neck of each bag the required routing and loads it on to a passing unloaded carriage whose route control element he moves to the position corresponding to the route to destination; the operator does nothing about route availability—i.e., he does not study the telltales 324, 424. When a carriage is routed, for instance, to the path 30 and the carriage passes the detector disposed upstream of the points 18, the carriage route control element (index) closes the contacts 311. If there is no carriage in the storage zone 34, the contact 36 is in the open position and the trigger 321 is normal. The and-gate 322 is therefore in the closed position, and so no order is given and the points 18 stay normal so that the loaded carriage passes on to the relief path 20. If the contact 36 is closed by a carriage held at the exit from the zone 34 by the electric stop device 35, a state of affairs which may arise after the carriage routed for the path 30 has travelled around the common path 10 and the relief path 20 one or more times, the gate 322 opens and output signals appear at the terminals 305, 304.

The output signal at terminal 305 releases the carriage held by the device 35, and the departure of the last-mentioned carriage opens the contacts 36 so that the trigger 321 returns to normal. The output signal from the trigger 329 energizes the relay associated with the points 18 and keeps such relay energized until the carriage has passed beyond the points 18 and closes the contacts 16 so that the trigger 329 returns to normal. The departure of the marked or indexed carriage on to the path 30 leaves a place available on the path 20, and since the time taken to travel along the relief path 20 between the points 18 and the junction where the path 20 rejoins the path 10 is the same as the time taken for a carriage to travel between the device 35 and the last-mentioned junction, the carriage released by the device 35 occupies the available place on the common path 10.

The route control element corresponding to the path 30 operates the relay device 37 to set the points 38 for the path 30.

The logic circuit 400 operates just like the circuit 300; it is controlled by contacts 411 in turn controlled by contacts 46, and the route control element corresponding to the path 40 causes the points 38 to be set for the path 40. Since only one of the contact sets 311, 411 can be closed by any one carriage at a time, there is no risk of the two circuits 300, 400 operating simultaneously and they are therefore completely independent of one another. The organization hereinbefore described can therefore be extended to any conveyor having any number of bypasses or shunts or reliefs or the like such as 30 and 40.

In the embodiment hereinbefore described, the points 18 at the start of the relief path 20 are disposed upstream of the junction between the paths 30 and 40 and are therefore controlled either by the circuit 300 or by the circuit 400. Since the same are independent of one another, any other arrangement is possible, more particularly one of the kind in which monostable points similar to 18 and controlled by the circuit 300 lead to the path 30, a second set of similar points leads to the path 40 in response to an order signal from the circuit 400, and carriages routed neither to the path 30 nor the path 40 complete their circuit via the relief path 20.

If the stations, as 33, 43, on bypasses or the like, as 30, 40, are considered as unloading stations, the routing of the carriages passing through such stations is normally cancelled thereat so that the unloaded carriages return to the circulating stock until they are loaded again at the station 13 and given a fresh routing at the station 5. However, stations such as 33, 43 can be considered as stations where any operation may be performed, such as altering the load of a carriage, whereafter the same can be rerouted.

In the alternative embodiment shown in FIG. 2, the various circuits are not in parallel with a single relief path; instead, each "operative" circuit is in parallel with a portion of the main path, such portion acting as a relief path for the particular "operative" circuit concerned. For instance, a conveyor has a main path 10 comprising four stations—a loading station 13, disposed directly on the path 10, and three loading and unloading stations 53, 63, 73, disposed on respective shunts or bypasses or the like 50, 60, 70 in parallel with portions 15, 16, 17 respectively of the main path 10. Routing devices 5, 535, 635, 735 are disposed near the respective access stations 13, 53, 63, 73, and upstream and downstream storage zones of equal capacity are disposed one each on either side of the stations 53, 63, 73, the upstream zones 51, 61, 71 having manual release, while the downstream zones 54, 64, 74 have electric holding and release devices or distributors 55, 65, 75 at their respective exit. The times taken for the carriages to travel between each distributor 55, 65, 75 and the junctions between, on the one hand, the paths 50, 60, 70 and, on the other hand, the main path 10 are equal to the times taken by the carriages to travel along the corresponding main-circuit portions 15, 16, 17. The logical circuitry for the second embodiment can be identical to the circuits 300, 400 of the embodiment shown in FIG. 1, but whereas the latter were described as controlling monostable points 18, the logical circuits 500, 600, 700 of FIG. 2 are shown as adapted to control bistable points 58, 68, 78 and as adapted to release the carriages in an accurate phase relationship with the pitch of the driving chain.

Disposed immediately upstream of each set of points 58, 68, 78 is a respective route detector each comprising two contact sets 57, 157; 67, 167; and 77, 177. Each carriage has two indexes or route control elements having two positions—a top position and a bottom position—and the four combinations can provide a selective closure, as the carriages pass by, of the detector contacts of the points 58, 68, 78 as follows:

| First index | Second index | Closed contacts |
|---|---|---|
| Top position | Bottom position | 57, 167, 177 |
| Do | Top position | 157, 67, 177 |
| Bottom position | do | 157, 167, 177 |
| Do | Bottom position | 157, 167, 177 |

Three contacts are associated with each distributor 55, 65, 75. Contacts 56, 66, 76 are provided to detect the presence of at least one carriage in the downstream storage zones 54, 64, 74 of the stations 53, 63, 73 and are closed provided that at least one carriage is so present. Contacts 52, 62, 72 are provided which synchronize carriage release with the pitch of the conveyor driving chain, the latter contacts being closed when blocks or the like distributed along the chain and serving to drive the carriages pass over the contacts. Contacts 59, 69, 79 are provided to detect departure of the carriages released from the distributors 55, 65, 75, the latter contacts being closed when such carriages pass by.

Since the logic circuits 500, 600, 700 are identical and independent, a description will be given only of the circuit 500. The same comprises a monostable trigger 521 which in its normal position, and through the agency of an or-gate 523 and output terminal 581, sets the points 58 for the main-circuit portion 15 which shunts the bypass 50; the trigger 521 is operative only when, with the contacts 56 closed, the operative input of the trigger is connected via the terminal 560 and the contacts 56 to the potential source 7. The contacts 157 are connected by the or-gate 523 to terminal 581. When in the working position the trigger 521 opens an and-gate 522 whose second input is connected via terminal 571 and contacts 57 to source 7. The output of and-gate 522 is connected in parallel to an output terminal 580 and to the actuating input of a bistable trigger 524. The output terminal 580 is connected to the input for setting the points 58 for the path 50. The operative output of the trigger 524 is connected to one input of an and-gate 525 whose second input is connected via an input terminal 520 to the contacts 52 and therethrough to the source 7. The zero resetting input of the trigger 524 is connected via a terminal 590 to the contacts 59 and therethrough to the source 7.

This conveyor operates similarly to the conveyor shown in FIG. 1. When the chain is started the carriages pass by the station 13 at a constant rate. The carriages may or may not be loaded at the station 13, then routed at the station 5 for one of the stations 53, 63, 73. If, for instance, the carriage route control elements are set for the path 60, then, as the carriage concerned passes by the upstream detector of the points 58, the contacts 157 close so that, through the agency of the source 7, contacts 157, terminal 570, or-gate 523 and terminal 581, the points 58 are set for the main-circuit portion 15, whereafter, as the carriage passes by the upstream detector of the points 68, the contacts 67 close and the source 7 applies its potential to the second input of the and-gate 622. If the trigger 621 is normal the and-gate 622 is closed, the points 68 are set for the main-circuit portion 16 and the carriage travels right the way around the main path 10 before reappearing before the points 68, having in its travel closed the contacts 177 to be routed via the main-circuit portion 17. However, if a carriage is present in the storage zone 64 and closes the contacts 66, the trigger 621 is operative and the gate 622 is opened. The points 68 receive a signal setting them for the path 60 and the trigger 624 comes into operation. When the first block or stud or the like closing the contacts 62 passes by, the gate 625 opens and transmits a release signal to the distributor 65 which releases a carriage, the same having been routed at the station 635 to any of the other three access stations. Closure of the contact 69 by the passing carriage resets the trigger 624 to normal. Since each of the stations 53, 63 and 73 of the conveyor can be a loading station or unloading station or load-modifying station, empty as well as loaded carriages can, if required, be routed from the station 13 and from any of the stations 53, 63, 73, the concomitant return of a carriage from the downstream storage zone of the destination station affecting a loaded or an empty carriage.

If required, the carriages can have a set of route control elements so that a number of consecutive destinations can be set up in a given order to form a complete programme giving the sequence of operations to be performed on any particular article, the time allotted for each operation being left to the operators' discretion.

What is claimed is:

1. A conveyor comprising a main path, a plurality of auxiliary paths shunted across said main path and forming looped circuits with the same, said auxiliary paths being connected to said main path by points at their entry and by a junction at their exit, routable carriages, synchronous driving chains adapted to drive said carriages along said main and auxiliary paths, a loading station on said main path, loading and unloading stations on each auxiliary path, each loading and unloading station having on each side an upstream storage zone and a downstream storage zone of equal capacity wherein said carriages may be disengaged from said driving chains, blocking means of said carriages at the exit of said storage zones, means for detecting the presence of at least one carriage in each of said downstream storage zones, means for releasing a carriage from said downstream storage zone, route detectors disposed close before said entry points, means for controlling said entry points in order to actualize the routing of said carriages, said route detector and said carriage presence detecting means being so associated as simultaneously to control said means for controlling said entry points and said means for releasing a carriage from said downstream storage zone, the switching of a given carriage to a given auxiliary path being only conditioned by the presence of at least one carriage in the downstream storage zone of said given auxiliary path, whereby all the carriages travel around said main path until a carriage is present in the downstream storage zone of the loading and unloading station for which they are routed at the time when they pass to the entry of the points for the corresponding auxiliary path.

2. Conveyor comprising a main path, a plurality of auxiliary paths shunted across said main path and forming with the same looped circuits, said auxiliary paths being connected to said main path by points at their entry and by a junction at their exit, routable carriages, synchronous driving chains adapted to drive said carriages along said main and auxiliary paths, stations on each auxiliary path, said stations being operable as required as loading, unloading and temporary parking stations for said carriages, each station being provided with means for unconditional routing of said carriages and each station having on each side an upstream storage zone and a downstream storage zone of equal capacity wherein said carriages may be disengaged from said driving chains, blocking means of said carriages at the exit of said storage zones, means for detecting the presence of at least one carriage in each of said downstream storage zones, means for releasing a carriage from said downstream storage zone, route detectors disposed close before said entry points, means for controlling said entry points in order to actualize the routing of said carriages, and said route detector and said carriage presence detecting means being so associated as simultaneously to control said means for controlling said entry points and said means for releasing a carriage from said downstream storage zone, the switching of a given carriage onto a given auxiliary path being only conditioned by the presence of at least one carriage in the downstream storage zone of said given auxiliary path, whereby all the carriages travel around said main path until a carriage is present in the downstream zone of the station for which they are routed at the time when they pass to the entry of the points for the corresponding auxiliary path.

3. Conveyor comprising a main path, a plurality of auxiliary paths shunted across said main path and forming with the same looped circuits, said auxiliary paths being connected to said main path by points at their entry and by a junction at their exit, routable carriages, synchronous driving chains adapted to drive said carriages at a given pitch along said main and auxiliary paths, stations on each auxiliary path, said stations being operable as required as loading, unloading and temporary parking stations for said carriages, each station being provided with means for unconditional routing of said carriages and each station having on each side an upstream storage zone and a downstream storage zone of equal capacity wherein said carriages may be disengaged from said driving chains, blocking means of said carriages at the exit of said downstream storage zones, the travel time of the carriages from the entry points to the exit junction of a given auxiliary path along said main path and from the end of the downstream storage zone to the exit junction of the said given auxiliary path being the same, means for detecting the presence of at least one carriage in each of said downstream storage zones, means for releasing a carriage from said downstream storage zone, route detectors disposed close before said entry points, means for controlling said entry points in order to actualize the routing of said carriages, said route detector and said carriage presence detecting means being so associated as simultaneously to control said means for controlling said entry points and said means for releasing a carriage from said downstream storage zone, the switching of a given carriage onto a given auxiliary path being only conditioned by the presence of at least one carriage in the downstream storage zone of said given auxiliary path, whereby all the carriages travel around said main path until a carriage is present in the downstream storage zone of the access station for which they are routed at the time when they pass to the entry of the points for the corresponding auxiliary path, and any carriage released from the downstream storage zone of a given access station automatically takes the place in said main path of the carriage simultaneously switched to said station.

References Cited by the Examiner

UNITED STATES PATENTS 3,174,438  3/1965  Hariton _____ 104—88

FOREIGN PATENTS 1,323,523  3/1963  France.

ARTHUR L. LA POINT, *Primary Examiner.*

S. B. GREEN, *Assistant Examiner.*